Nov. 25, 1969  A. J. ROTONDO  3,479,966
TOW TRUCK SWITCHING SYSTEM
Filed April 17, 1967
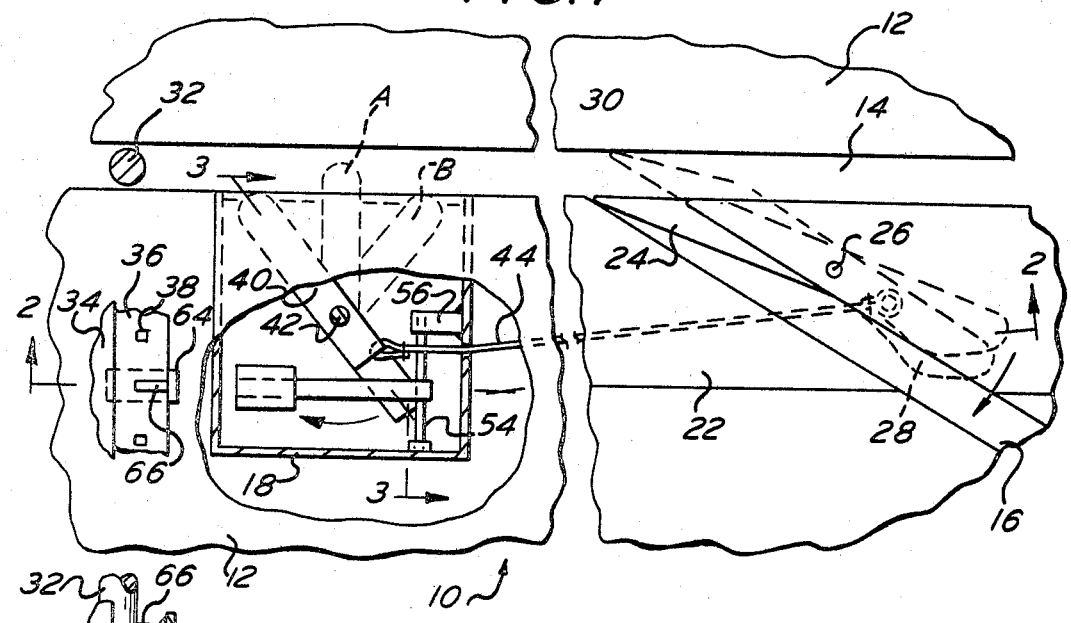
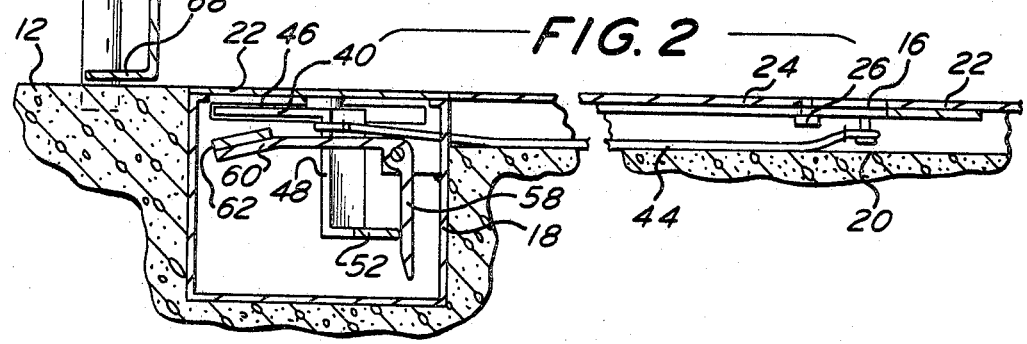
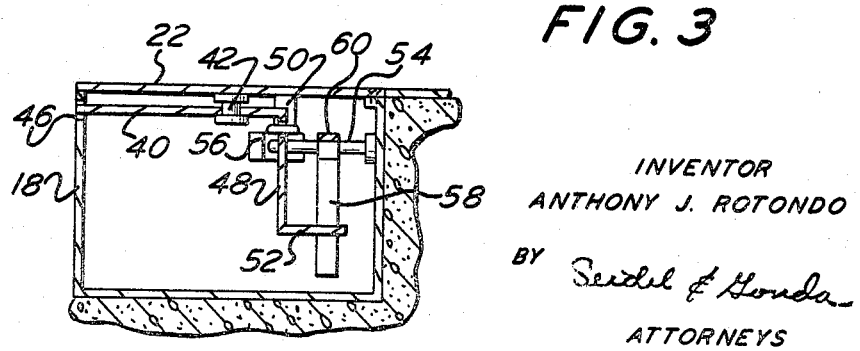
INVENTOR
ANTHONY J. ROTONDO
BY Seidel & Gonda
ATTORNEYS Patented Nov. 25, 1969

3,479,966
TOW TRUCK SWITCHING SYSTEM
Anthony J. Rotondo, Easton, Pa., assignor to SI Handling Systems, Inc., Easton, Pa., a corporation of Pennsylvania
Filed Apr. 17, 1967, Ser. No. 631,364
Int. Cl. B61k 1/00; B61j 3/00; B61b 13/00
U.S. Cl. 104—88
9 Claims

ABSTRACT OF THE DISCLOSURE

A tow truck switching system is provided wherein structure on a tow truck initiates movement of a switching member with a small force from an inactive position to an intermediate position so that it projects into the path of a tow pin on the tow truck. The tow pin contacts the switching member in the intermediate position thereof and with a larger force physically moves it to an active position. Movement of the switching member from its intermediate position to its active position moves a switch plate so that the tow pin will be transferred from movement along the main slot to movement along a shunt slot. The structure for initiating movement of the switching member may be a magnet.

---

This invention relates to a tow truck switching system wherein a tow truck is provided with a tow pin which extends into a main slot. A conveyor means in the main slot contacts the tow pin and moves the tow truck along the main slot. The main slot is intersected at spaced points therealong by shunt slots which extend in a direction away from the main slot. Adjustable means are provided on the truck so that it may be caused to selectively enter a predetermined shunt slot. For typical patents illustrating such a system, see U.S. Patents 3,103,183 and 3,103,895.

In said patents, structure on the truck contacts an actuator for a switch plate. The switch plate controls movement from the main slot to the shunt slot. A substantial amount of force is generally required to effect actuation of a switch plate. In accordance with the present invention, structure is provided on the tow truck for initiating movement of a switching member with a small force from an inactive position to an intermediate position. In the intermediate position, the switching member projects into the main slot in the path of a tow pin on the truck. The two pin is being pushed by the conveyor in the main slot and therefore has a substantial amount of force associated with it. The tow pin uses this larger force to move the switching member from its intermediate position to an active position and thereby effect movement of the switch plate. Only a small force is required to move the switching member to its intermediate position and this can be accomplished by the use of magnets, simple electrical battery operated circuits, etc.

It is an object of the present invention to provide a novel non-powered tow truck switching system.

It is another object of the present invention to provide a tow truck switching system wherein a small force places a switching member into the path of a larger force sufficient to move a switch plate controlling movement between a main slot and a shunt slot.

It is another object of the present invention to provide a novel magnetic switching system for tow trucks caused to move along a shunt slot and selectively capable of being diverted to movement a shunt slot.

It is another object of the present invention to provide a non-powered switching system for tow trucks which is simple, reliable, inexpensive, and requires little or no maintenance.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a partial plan view of the tow truck switching system of the present invention.

FIGURE 2 is a sectional view taken along the line 2—2 in FIGURE 1.

FIGURE 3 is a sectional view taken along the line 3—3 in FIGURE 1.

Referring to the drawing in detail, wherein like numerals indicate like elements, there is shown in FIGURE 1 a tow truck switching system designated generally as 10.

The system 10 includes a reference surface such as a floor 12 having a main slot 14 therein. The main slot 14 is intersected at spaced points therealong by shunt slot extending in a direction away from the main slot. In FIGURE 1, there is illustrated only one shunt slot 16. The shunt slots 16 can extend from either side of the main slot as is conventional in the art to which the present invention pertains.

The floor 12 is provided with a cavity within which is disposed a housing 18. The floor 12 is also provided with a recessed portion 20. The cavity and the recessed portion are covered by one or more metallic plates 22 flush with the floor 12. The plates 22 are removable and facilitate access to the space therebelow.

A switch plate 24 is pivotably supported by the undersurface of plate 22 or any other convenient surface for pivotable movement about the longitudinal axis of pin 26. For purposes of illustration, the switch plate 24 is pivotably supported so as to lie in a plane immediately below the plane of plate 22. Switch plate 24 is provided with a cam portion 28. Portion 28 projects into the shunt slot 16 when plate 24 is in the phantom position. At the opposite end of plate 24 from the cam portion 28, the plate 24 is provided with a side face 30 which forms a continuation of the main slot 14 and prevents diverting a tow pin from the main slot into the shunt slot 16. In the phantom position of switch plate 24, it obstructs the main slot 14 and facilitates diverting a tow pin from movement along the main slot 14 to movement along the shunt slot 16.

A tow truck, not shown but otherwise conventional and comparable to those in the above-mentioned patents, may be provided for movement along the main slot 14. A tow truck is provided with a tow pin 32 which depends downwardly and extends into the main slot 14 to effect guiding the truck along the main slot and for contact with a powered conveyor, not shown, and which may be conventional.

The tow truck may be provided with a frame which is partially shown and designated generally as 34. Frame 34 includes a plate member 36 having a plurality of spaced holes 38 therealong and extending to either side of the main slot 14. The holes 38 are in line with one another and form a line which is to the right of the longitudinal axis of tow pin 32 as shown in FIGURES 1 and 2.

A switching member 40 is provided within housing 18 and mounted for pivotable movement about the longitudinal axis of an upright pin 42. Pin 42 may be conveniently supported on the undersurface of plate 22. In FIGURE 1, member 50 is shown in its inactive position in solid lines. Member 42 is adapted to be moved to an intermediate position designated by the letter A and for movement to an active position designated by the letter B. Member 40 is coupled to the switch plate 24 in any convenient manner such as by cable 44.

Cable 44 is connected to a downwardly extending leg 48 on the member 40 and extends through a slot 50 in a side wall of the housing 18. Leg 48 is provided with an extension 52 generally parallel to member 40. A side wall of the housing 18 is provided with a slot 46 of sufficient length so as to facilitate pivotable movement of the member 40.

A rod 54 is supported between a bracket 56 and a side wall of the housing 18. A bell crank is pivotably supported by rod 54. The bell crank includes a leg 58 extending generally downwardly from the rod 54 and a leg 60 which is generally horizontal and perpendicular to leg 58. A magnet of the permanent type is supported adjacent the free end of leg 60 immediately below the plate 22. Plate 22 is preferably made from a non-magnetic material such as aluminum. A limit stop, not shown, is provided for the bell crank so that it assumes a normal position as illustrated in FIGURE 2.

A trip rod 64 is provided on the frame 34 of the tow truck on opposite sides of the main slot 14. Each trip rod 64 may be adjustably positioned along the frame 34. In this regard, trip rod 64 is provided with a finger 66 adapted to enter one of the holes 38. At its lower end, trip rod 64 is provided with an extension 68 which extends rearwardly to a position so that it extends beyond the longitudinal axis of the tow pin 32.

The operation of the system 10 is as follows:

The switch plate 24 will be in the solid line position as shown. A very light spring may be provided to retain the switching member 40 in the solid line position as shown. The bell crank supporting the magnet 62 is gravity biased to the position shown against a limit stop not shown. It will be assumed that the trip rod 64 has been positioned so that it enters the proper hole 38 whereby the extension 68 will pass directly over the magnet 62. Such a position for the trip rod 64 will cause the tow truck and its tow pin 32 to be diverted from movement along the main slot 14 to movement along the shunt slot 16 as described hereinafter.

As the extension 68 moves over the magnet 62, the magnet 62 is magnetically attracted upwardly, thereby causing the bell crank to pivot in a clockwise direction in FIGURE 2. Such pivotable movement of the bell crank causes leg 58 to contact leg 52 and thereby rotate the switching member 40 from the solid line position in FIGURE 1 to the intermediate position designated by the letter A. Only a small force is required to accomplish this movement of the switching member. In its intermediate position designated by the letter A, member 40 is now in the path of movement for the tow pin 32 and remains in that position until contacted by the tow pin 32. Member 40 is caused to remain in that position due to the length of extension 68 on the trip rod 64.

When the magnet 62 is no longer attracted upwardly by extension 68, it is gravity-biased to the position shown in FIGURE 2. In moving from the solid line position in FIGURE 1 to the intermediate position designated by the letter A in FIGURE 1, such movement takes up the slack in cable 44. Any other well known lost motion device may be utilized. Thereafter, the tow pin 32 which is being pushed by a conveyor, not shown, physically moves the switching member 40 from the intermediate position as designated by the letter A to its active position designated by the letter B. The last-mentioned movement of the switching member 40 causes the cable 44 to rotate the switch plate 24 to the phantom position in FIGURE 1 wherein it obstructs the main slot 14 and forms a continuation of the shunt slot 16.

When the tow pin 32 contacts the switch plate 24, it is caused to be diverted into the shunt slot 16. As the tow pin 32 moves along the shunt slot 16, it will contact the cam portion 28. Such contact will reposition the switch plate member 24 to its solid line position in FIGURE 1 and simultaneously cause the switch member 40 coupled thereto by the cable 44 to move to its solid position in FIGURE 1. Thereafter, additional trucks will continue to move along the main slot 14 unless their trip rod 14 is positioned at a proper distance from the center of the main slot 14 so that extension 68 on the trip rod will pass directly over the magnet 62.

It is to be noted that the switch plate 24 is not biased by springs or the like to an open position or a closed position. However, it is within the scope of the present invention to provide such suitable spring bias if desired. Also, it is within the scope of the present invention to provide a small spring biased latch to retain the switch plate 24 in each of its positions until physically moved therefrom by the force of the tow pin 32 as it moves along either the main slot or the shunt slot. If the switch plate 24 is spring biased to the phantom position shown in FIGURE 1 but obstructed by a latch, movement of switch member 40 from the intermediate position designated by the letter A to the active position designated by the letter B could be utilized to release the latch so that the spring bias could then move the switch plate member 24.

The preferred embodiment described above and illustrated in the drawings provides the permanent magnet in the housing 18. It would be within the scope of the present invention to mount the permanent magnet on extension 68 and make the leg 64 from a magnetically attractable material. Another embodiment within the scope of the present invention wherein a small force is utilized to move a switching member into the path of the tow pin would include a simple electric circuit involving a battery, a solenoid and a magnet-operated switch. A magnet such as magnet 62 would move up and down to control opening and closing the switch. When the switch is closed, the solenoid would be utilized to provide the small force necessary to move the switching member 40 from its inactive position to its intermediate position. Other equivalent devices will suggest themselves to those skilled in the are for attaining the objects of the present invention.

The present invention may be embodied in other specific forms without departing from the spirit or essential attributes thereof.

It is claimed:

1. In a tow truck switching system wherein propelled tow trucks are provided with tow pins entering a main slot for guiding tow trucks therealong, the main slot being intersected at spaced points therealong by shunt slot, a switch plate at the intersection of a main slot and a shunt slot for controlling movement of trucks from the main slot to the shunt slot, a switching member mounted alongside the main slot and coupled to the switch plate for controlling movement of the switch plate, comprising a small force actuator means associated with the switching member and responsive to structure on a truck for initiating movement of the switching member from an inactive position to an intermediate position wherein the switching member projects into the main slot for contact with a tow pin on the truck, said tow pin being coupled to the conveyor means when there is contact between the tow pin and the switching member thereby moving the switching member from its intermediate position to initiate movement of said switch plate by means of a larger force.

2. In a system in accordance with claim 1 wherein said switching member is mounted for movement about a substantially vertical axis with the distance between said axis and the main slot being less than the length of the switching member.

3. In a system in accordance with claim 1 wherein said actuator means includes a permanent magnet associated with said switching member to effect movement of the switching member in response to movement of the permanent magnet.

4. In a system in accordance with claim 3 wherein said permanent magnet is mounted on a pivotable arm below the reference surface containing said slots.

5. In a tow truck system wherein tow trucks in rolling contact with a reference surface are provided with a tow pin entering a main slot in the reference surface, said reference surface having shunt slots intersecting the main slot at spaced points therealong, a switch plate controlling the intersection of the main slot and a shunt slot, a switching member mounted alongside the main slot and coupled to the switch plate for controlling movement of the switch plate, comprising said switching member having an active position wherein it activates said switch plate and an inactive position wherein the tow pin does not contact the switching member and an intermediate position wherein the switching member projects into the main slot and contacts the tow pin so that said tow pin will move said switching member to its active position while the tow pin is moving along the main slot, and magnetic means for moving the switching member from its inactive position to its intermediate position.

6. In a system in accordance with claim 5 wherein said means includes a trip member on the truck, said trip member having a portion extending rearwardly of the truck generally parallel to the main slot at the lower end of the trip member.

7. In a system in accordance with claim 6 wherein said means includes a permanent magnet below said reference surface, said rearwardly extending portion on said trip member being of magnetically attractable material, said trip member being selectively positionable at different distances away from the main slot, and said magnet being mounted for movement in a generally upright direction when attracted by said rearwardly extending portion on the trip member.

8. A system in accordance with claim 5 including a floor mounted magnet for initiating control of movement of the tow pin between said slots in a downwardly extending truck mounted trip rod selectively positionable at a distance from the main slot corresponding to the distance between the magnet and the main slot, said trip rod having an extension of magnetizable metal at its lower end projecting in a direction generally perpendicular to said trip rod.

9. In tow truck system wherein tow trucks in rolling contact with a reference surface are provided with a tow pin entering a main slot in the reference surface, said reference surface having shunt slots intersecting the main slot at spaced points therealong, a switch plate controlling the intersection of the main slot and a shunt slot, a switching member mounted alongside the main slot and coupled to the switch plate for controlling movement of the switch plate, comprising said switching member having an active position wherein it activates said switch plate and an inactive position wherein the tow pin does not contact the switching member and an intermediate position wherein the switching member does contact the tow pin so that said tow pin will move said switching member to its active position while the tow pin is moving along the main slot, magnetic means for moving the switching member from its inactive position to its intermediate position, said magnetic means including a trip member on the truck, said trip member having a portion extending rearwardly of the truck generally parallel to the main slot at the lower end of the trip member, said magnetic means further including a permanent magnet below said reference surface, said rearwardly extending portion on said trip member being of magnetically attractable material, said trip member being selectively positionable at different distances away from the main slot, said magnet being mounted for movement in a generally upright direction when attracted by said rearwardly extending portion on the trip member, and the length of the extension being sufficient so that it is longer than the magnet in a direction parallel to the main slot.

References Cited

UNITED STATES PATENTS

| | | | |
|---|---|---|---|
| 2,816,516 | 12/1957 | Diehl | 104—88 |
| 3,261,300 | 7/1966 | Johnson | 104—172 X |
| 3,373,698 | 3/1968 | Bishop | 104—88 |

ARTHUR L. LA POINT, Primary Examiner

D. F. WORTH, III, Assistant Examiner

U.S. Cl. X.R.

104—172